United States Patent [19]
Nakamichi

[11] Patent Number: 4,875,126
[45] Date of Patent: Oct. 17, 1989

[54] STATIONARY TAPE GUIDE FOR A MAGNETIC TAPE RECORDER

[75] Inventor: Niro Nakamichi, Kodaira, Japan

[73] Assignee: Nakamichi Corporation, Tokyo, Japan

[21] Appl. No.: 154,265

[22] Filed: Feb. 10, 1988

[51] Int. Cl.[4] .............................................. G11B 15/60
[52] U.S. Cl. ............................. 360/130.23; 360/130.21
[58] Field of Search ...................... 360/130.23, 130.22, 360/130.21, 130.2, 85, 95

[56] References Cited

U.S. PATENT DOCUMENTS 3,890,641  6/1975  Mo et al. ......................... 360/130.23

FOREIGN PATENT DOCUMENTS 59-221857  12/1984  Japan ............................... 360/130.21
60-171667   9/1985  Japan ............................... 360/130.21

OTHER PUBLICATIONS

Nikkei Shango Shinbun, "Joint Project Between Nakamichi and Sankyo Succeeded in Stabilizing Tape Running by Developing a Core Part for DAT", Feb. 2, 1988.

Nikkan Kogyo Shinbun, "A New Development in R–DAT Mechanism", Feb. 2, 1988.

Nakamichi Press Release, Feb. 1, 1988, With Original Photograph.

Primary Examiner—John H. Wolff
Assistant Examiner—Matthew J. Bussan
Attorney, Agent, or Firm—Klein & Vibber

[57] ABSTRACT

A stationary tape guide, for a magnetic tape recorder utilizing helical scanning, having a laterally extending guide path, the generous contour of which is forwardly convexed on a projection on a horizontal reference plane, along which at least two straight guide projections inclined to said reference plane and a single straight guide projection extending orthogonal to said reference plane are serially and integrally provided. Such a guide is secured in close proximity to a cylinder at its opposite sides to thereby guide the tape contacting with the tape surface on which a magnetic material is coated.

13 Claims, 5 Drawing Sheets

STATIONARY TAPE GUIDE FOR A MAGNETIC TAPE RECORDER

FIELD OF THE INVENTION

The present invention relates to a tape guide for a magnetic tape recorder, and more particularly relates to a stationary tape guide to be disposed in close proximity to a cylinder having a rotary head.

BACKGROUND OF THE INVENTION

In a magnetic tape recorder which may store and reproduce information by helical scanning, it is common to provide a cylinder, having a rotary head, inclining to a horizontal reference plane (for example, a top surface of a chassis) which is perpendicular to rotational axes of tape reels. When such a cylinder is utilized, a pair of tape pulling-out means are required to pull out a tape from a tape cassette and to wind the tape around the cylinder for a predetermined angle.

In this connection, it has be known that when a tape which is transferred keeping the tape surface orthogonal to a reference plane and keeping the tape edge parallel to the reference plane is contacted with a cylinder surface which is inclined to said reference plane, the orientation of the surfaces and edges of said tape with respect to the reference plane are varied.

There is a known tape pulling-out means which has two guide pins, one is incling and the other is oriented orthogonal to a reference plane, which are mounted on a carrier movable between a home position adjacent to a tape reel and a pulled out position or a loading position adjacent to a cylinder. More particularly, the inclining pins may change the orientation of the surfaces and edges of said tape with respect to the reference plane upstream and downstream of said cylinder so that tape surfaces which are orthogonal to said reference plane are changed into nonorthogonal (upstream) or vice versa (downstream) and that tape edges which are parallel to the reference plane are changed into nonparallel (upstream) or vice versa (downstream). When the pulling-out means are moved, however, the inclining guide pins are contacted with the tape surface and a force to move the tape in the direction of its width is generated. This force may cause a shift of the tape and movement of the tape away from the cylinder which results failure of pulling-out of the tape.

A tape pulling-out means having a pulurality of inclining pins is disclosed in Japanese Unexamined Patent Application, Gazette No. 60-253053. The use of a plurality of inclining pins necessitates accurate adjustment of relative inclination between the pins and the associated cylinder in manufacturing and installation. In order to reduce the troublesome adjustment of the relative inclination, it is proposed, in this reference, to form two inclining pins in one block.

However, the tape pulling-out means having one or more inclining pins has the defect that it requires accurate installation and positioning at their pulled out position, since inaccuracy in installation or positioning may result in inaccuracy in the winding angle of the tape on the inclining pin, which in turn results in inaccuracy of the angle between the tape surfaces and a reference plane and inaccuracy of the distance between the tape edges and the reference plane. This problem cannot been solved even if a guide block having one or more inclining pins is fixedly diposed with respect to a cylinder as a stationary guide, since inaccuracy of the position of the pulling out pin may result in inaccuracy of the winding angle of the tape on said inclining pin.

SUMMARY OF THE INVENTION

Therefore, it is an object of the present invention to provide a stational tape guide, having a purality of inclining straight guide projections as well as a single orthogonal straight guide projection as integral parts thereof, which is to be fixed in close proximity to a cylinder.

BRIEF DESCRIPTION OF THE DRAWINGS

With these and other objects in view, which will become apparent in the following detailed description, the present invention, which is shown by example only, will be clearly understood in connection with the accompanying drawing, in which.

DETAILED DESCRIPTION OF THE INVENTION

Figure 1:
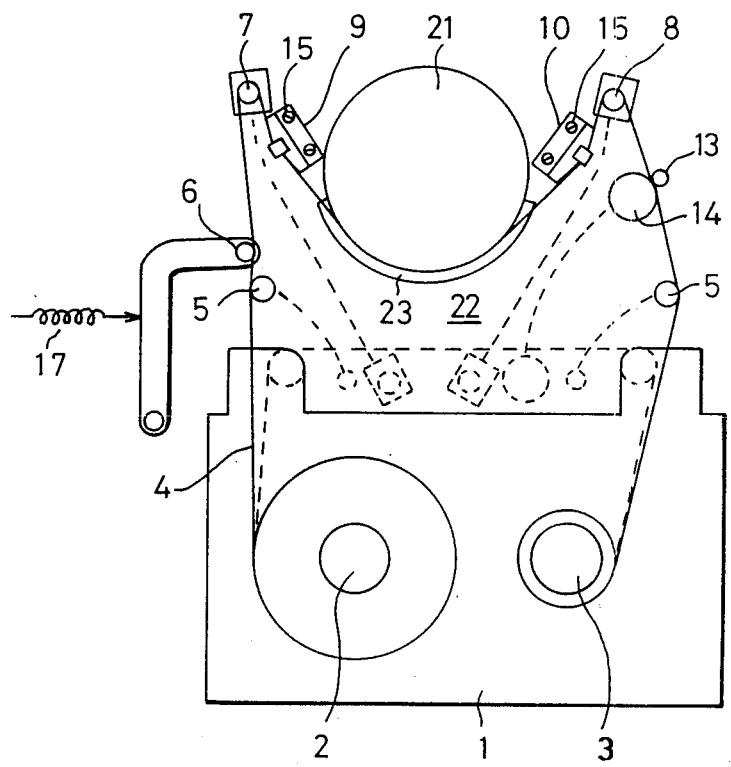
FIG. 1 generally shows a tape transferring path in a magnetic tape recorder in which a pair of stationary tape guides in accordance with the present invention are installed.
Figure 2:
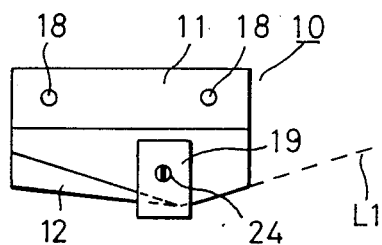
FIG. 2 shows a plane view of a stationary tape guide in accordance with an embodiment of the present invention.
Figure 3:
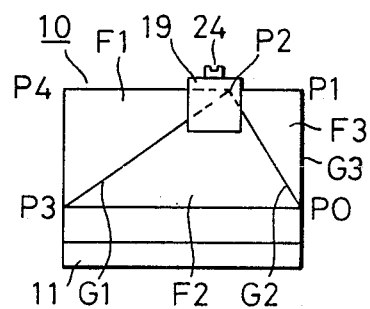
FIG. 3 is a front view of the tape guide of FIG. 1.
Figure 5:
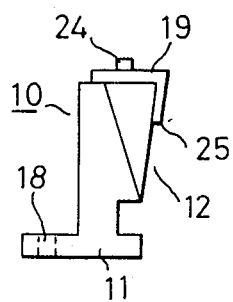
FIG. 5 is a right side view of the tape guide of FIG. 1.
Figure 4:
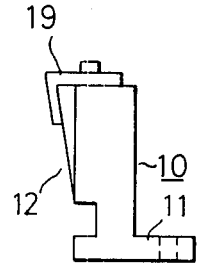
FIG. 4 is a left side view of the tape guide of FIG. 1.

Referring to FIG. 1, there is shown a tape transferring path in a magnetic tape recorder in which a pair of tape guides 9 and 10 in accordance with the present invention are installed. Tape 4 which is pulled out of casette 1 by a pair of pulling out pins 7 and 8 is led from reel 2 to stationary tape guide 9, which is fixed on a chassis or a reference plane 22, via guide rollers 5. Tension pole 6 which is mounted on arm 16 biased with spring 17 for absorbing variations in tape tension. The stationary tape guide 9 contacts with the tape surface on which magnetic material is coated.

Tape 4 led from guide 9 is helically wound around on a cylinder 21 which has a rotary head and is inclined to reference plane (or chassis) 22 at a predetermined angle. Cylinder 21 has a stational lead 23 to guide the lower edge of tape 4.

Tape 4 is guided from cylinder 21 by stationary tape guide 10 and is led to reel 3 via pulling out pin 8 and guide roller 5. Capstan 13 and pinch roler 14 cooperate to transfer tape 4 along the path as described and shown in FIG. 1.

When tape 4 arives at and leaves from cylinder 21, the tape surfaces are not orthogonal to reference plane 22 and the tape edges are not palarell thereto. Tape guide 9 orients the surfaces and edges of tape 4 which heretofore are kept orthogonal and parallel respectively to reference plane 22 into nonorthogonal and nonparallel, and tape guide 10 reorients the surfaces and edges of tape 4 which were kept unorthogonal and unparallel to reference plane 22 back into orthogonal and parallel respectively. These tape guides 9 and 10 are basically similar to each other with some exceptions, tape guide 10 will be explained in deteil hereunder.

Figure 6:
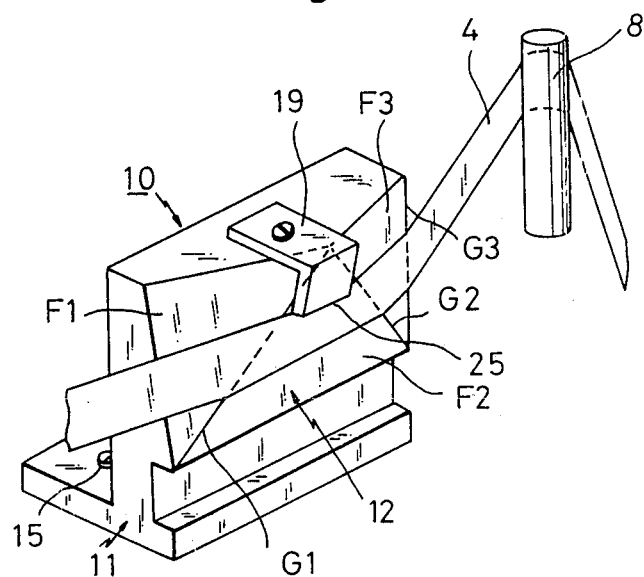
FIG. 6 is a perspective view of the tape guide of FIG. 1.

FIGS. 2-5 show respectively a plan view, a front view, a right side view, and a left side view of an embodiment of tape guide 10 in accordance with the present invention. FIG. 6 is a perspective view of the tape guide of FIG. 2 in operation.

Tape guide 10 comprises a base portion 11 and a head portion 12. Base portion 11 is provided with a pair of holes 18 for recieving screws 15 with which said block (tape guide) is installed on the top surface of chassis 22 allowing adjustment of the relative position of said tape guide 10 with respect to cylinder 21 and pulling out pin 8 at its pulled out position. Head portion 12 has a laterally extending guide path, the generous contour of which is forwardly convexed in a projection (FIG. 2) on a horizontal reference plane.

In the embodiment of FIGS. 2-6, two straight guide projections G1 and G2, inclined to reference plane 22, and a single straight guide projection G3 which, orthogonal to reference plane 22, are serially disposed along the guide path. In the embodiment of FIGS. 2-6, inclining straight guide projections G1 and G2 are formed as edges defined between adjacent two surfaces, F1 and F2 as well as F2 and F3 of head portion 12, and orthogonal straight guide projection G3 is formed as an edge of surface F3 of head portion 12.

It should be noted that tape 4 from cylinder 21 reaches edge G1 without contacting surface F1, then tape 4 is led to pulling-out pin 8 contacting surface F2, edge G2, surface F3 and edge G3.

The inclining angle of tape 4 at the position at which tape 4 leaves the surface of cylinder 21 is assinged to the inclination angles of edges G1 and G2 to reference plane 22. In other words, inclination angles of edges G1 and G2 to reference plane 22 are so defined as to reorient the tape surfaces and tape edges which are respectively inclined and nonparallel to reference plane 22 at the position at which tape leaves the surface of cylinder 21 gradually into a position orthogonal and parallel to reference plane 22.

When one or more edges G1-G3 are sharply formed, they also act as tape cleaners. Magnetic recording tape 4 generally has a thickness of about 10 and a few $\mu m$ and cannot be folded shaply, so that preferablly the edges G1-G3 are slightly rounded. Certainly edges G1-G3 can be rounded with a relatively large radius when a cleaning function is not required.

In the embodiment shown in FIGS. 2-6, tape edge guide means 19 is provided on the head portion 12. In this embodiment, tape edge guide means 19 is shown as having an L shaped profile and is detachablelly secured to the top of head portion 12 with a screw 24. Surface 25 of the downwardly extending leg portion of edge guide means 19 cooperatively acts with stationary lead 23 provided on cylinder 21 (FIG. 1) to confine the edges of tape 4 therebetween.

Pulling out pin 8 is movable between its home position shown in dotted line and the pulled out position shown with solid line along the path shown with broken line in FIG. 1. This pulled out position is not critical in the present invention, provided that the pin 8 is moved beyond the line L1 which lies on the extention plane of surface F3 shown in FIG. 2, and that pin 8 is orthogonal to reference plane 22. When these conditions are met, proper contact between the tape surface and edge G3 is assured regardless of inaccuracy of the position at which pulling out pin 8 is stopped, which in turn assures a constant winding angle of tape 4 on inclining straight guide projections. This is an important merit of the present invention wherein orthogonal straight guide projection (orthogonal edge G3) is integrally provided with stationary tape guide 10 on the side of pulled out position of pin 8.

Besides the aforesaid conditions for relative locations, it is necessary to orient the directions of inclining and orthogonal straight guide projections with respect to the reference plane in installation of the tape guide of the present invention. In other words, it is necessary to secure tape guide block 9 or 10 on chassis 22, so that straight guide projections G1 and G2 incline to reference plane 22 at predetermined angles in a predetermined direction and straight guide projection G3 is oriented orthogonal to reference plan 22. However, this is easier than accurate installation of the conventional pulling out means on which one or more inclining pins and a single orthogonal pin are mounted.

Figure 7:
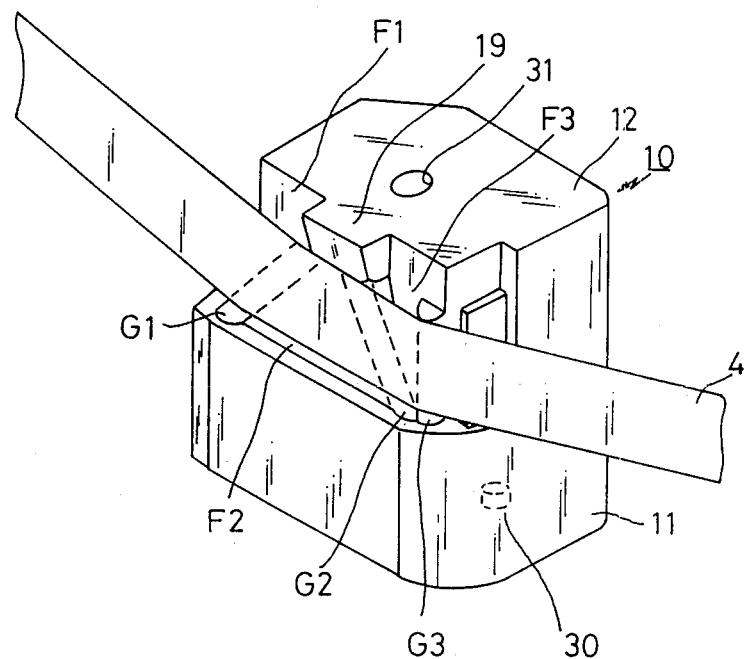
FIG. 7 is a perspective view of another embodiment of a tape guide in accordance with the present invention.

FIG. 7 shows a perspective view of another embodiment of guide block 10 in accordance with the present invention. In this embodiment, straight guide projections G1-G3 are formed as straight ridges, each having a semicircular cross section, forwardly projecting from surfaces F1, F2 and F3 of the guid path.

An integral edge guide projection 19 is provided at the area above surface F2. Edge guide projection 19 has a lower surface, facing the top surface of chassis 22, which cooperates with stationary lead 23 provided for cylinder 21 to restrict lateral movement of tape 4. Though it is not essential, in the preferred embodiment shown in FIG. 7, the front surface of said edge guide projection 19 is downwardly tapered and the edges between front and side surfaces and the lower surface are rounded. The tapered surface serves to shift tape 4 downwardly and the rounded edges serve to reduce damage to tape 4 when tape 4 rides on the edge of guide projection 19.

On the bottom surface of guide block 10 as shown in FIG. 7, a recess 30 is provided which serves for recieving a complementary projection of chassis 22 (notw shown). A hole 31 which is vertically extending through guide block 10 is provided to receive a bolt (not shown) with which guide block 10 is secured to chassis 22 in cooperation with a screw hole (not shown) on the chassis. Fitting of said recess 30 and complementary projection and securing with said bolt assure accurate location of guide block 10 in the vicinity of cylinder 21. Certainly any other conventional securing means inclusive of adjustable securing means is applicable. Features other than those described hereinabove are the same with the embodiment shown in FIGS. 2-6, and are not described for simplicity, but like items are designated with like reference alphanumerics.

Figure 8:
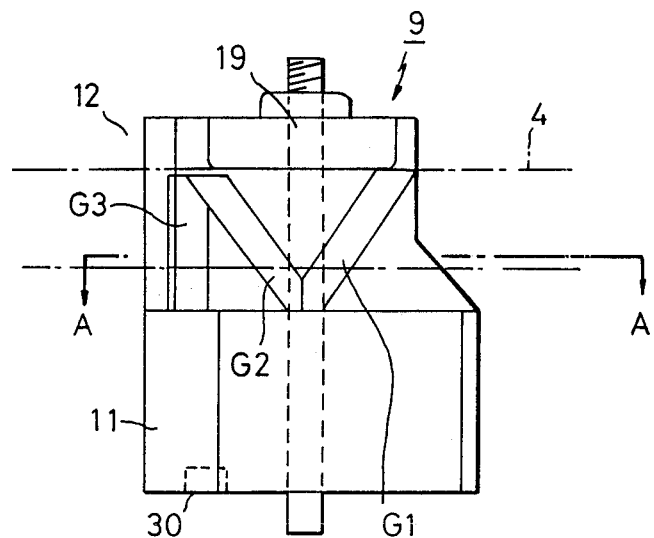
FIG. 8 is a front view of a further embodiment of a tape guide in accordance with the present invention.
Figure 9:
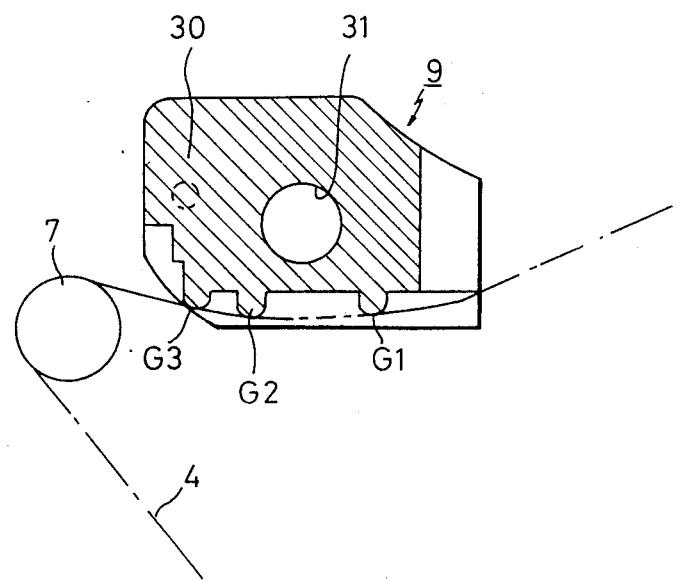
FIG. 9 is a cross section of the tape guide of FIG. 8 taken along the line A—A of FIG. 8.

FIG. 8 shows a front view of an embodiment of tape guide 9 in accordance with the present invention, and FIG. 9 is a section of the tape guide block 9 taken along the line A—A of FIG. 8. In this embodiment, straight guide projections G1, G2 and G3 and edge guide projection 19 are reversly arranged along the laterally extending guide path as compared with the tape guide 10. Also it will be noted that inclining guide projections G1 and G2 are reversly oriented in the shape V as compared with tape guide 10 in which straight guide projections G1 and G2 are arranged in the form of inverted V. As will be easily understood, surfaces of the portion of tape 4 guided with straight guide projection G1 and cylinder 21 and those guided with straight guide projections G2 and G3 are reversly inclined to the reference plane 22 compared to those in tape guide 10. Aforesaid features are the general differences between tape guides 9 and 10 which are located at the opposite sides of cylinder 21.

Now it will be understood that the present invention provide a stationary tape guide enabling accurate orientation of tape without affected inaccurate positioning at their pulled out positions of pulling-out means which has a single orthogonal pin.

Also it will be understood that a plurality of straight inclining guide projections and a single straight orthogonal guide projection are integrally formed on a guide block which eliminates inaccuracy of orientation of straight guide projections in manufacturing, installation of stationary guide blocks and operation of pulling out means.

Although the invention is described and illustrated with reference to a plurality of embodiments thereof, it is to be expressly understood that it is in no way limited to the disclosure of such preferred embodiments but is capable of numerous modifications within the scope of the appended claims.

What is claimed is:

1. A stationary tape guide for guiding a magnetic tape withdrawn from a tape cassette and securing said tape in close proximity to a helical scanning cylinder, said guide comprising:
    (a) a block having, on its front face which confronts said tape, a laterally extending guide path the contour of which includes a first straight guide projection inclined with respect to a horizontal reference plane which first projection is forwardly convexed toward said tape; and
    (b) said block being integrally provided with a second straight guide projection inclined with respect to said reference plane and a single orthogonal guide projection extending orthogonal to said reference plane said first, second, and orthogonal projections lying in series along said guide path.

2. A stationary tape guide as set forth in claim 1, wherein said straight guide projections are formed as rounded edges.

3. A stationary tape guide as set forth in claim 1, wherein at least one of said straight guide projections is formed as a sharp edge.

4. A stationary tape guide as set forth in claim 1, wherein said straight guide projections are formed as ridges each having a semi-circular cross section and projecting from said guide path surface.

5. A stationary tape guide as set forth in claim 1, wherein at least one of said straight guide projection is formed as a ridge having a sharp edge and projecting from said guide path surface.

6. A stationary tape guide as set forth in any of the preceding claims wherein said tape guide is further provided with means for guiding an edge of a tape.

7. A stationary tape guide as set forth in claim 6, wherein said edge guide means comprises means which is detachably mounted on said block at the area above said guide path.

8. A stationary tape guide as set forth in claim 6, wherein said edge guide means comprises at least a projection extending from said block at the location above the area between said two guide projections inclining to said reference plane.

9. A stationary tape guide for guiding the path of magnetic tape in close proximity to a helical scanning cylinder of a magnetic tape recorder having a tape reel rotatable about a reel axis, said guide comprising
    a tape guide block having a front face, which confronts said tape, said front face being convexly contoured and forming a laterally extending guide path with respect to a reference plane perpendicular to said reel axis;
    said guide path having a pair of straight guide projections, each of said straight projections forming an angle with respect to said reference plane and said pair of sraight projections forming an angle between each other; and
    said guide path having an orthogonal guide projection, said orthogonal guide projection extending orthogonal to said reference plane.

10. A stationary tape guide as claimed in claim 9, further comprising means for guiding the path of an edge of said tape.

11. A stationary tape guide as claimed in claim 9, further comprising means for guiding the path of an edge of said tape, said means extending from said block adjacent to said guide path to prevent lateral movement of said tape.

12. A stationary tape guide as claimed in claim 11, wherein said means is detachable.

13. A stationary tape guide as claimed in claim 9, further comprising means for guiding the path of an edge of said tape, said means extending from said block adjacent to said guide path to prevent lateral movement of said tape;
    said orthogonal projection being located at one end of said guide path and said straight projections being centrally located along said guide path;
    said means for guiding the path of an edge of said tape being centrally located adjacent said guide path.

* * * * *